United States Patent
Yin et al.

(10) Patent No.: US 9,286,093 B1
(45) Date of Patent: Mar. 15, 2016

(54) SETTING UP NETWORK ADAPTORS IN A VIRTUAL MACHINE

(71) Applicant: CA, Inc., Islandia, NY (US)

(72) Inventors: Jinxing Yin, SanHe (CN); Jiaolin Yang, Beijing (CN); Haiyang Zhang, Beijing (CN); Guoxian Shang, Beijing (CN)

(73) Assignee: CA, Inc., Islandia, NY (US)

( * ) Notice: Subject to any disclaimer, the term of this patent is extended or adjusted under 35 U.S.C. 154(b) by 192 days.

(21) Appl. No.: 13/892,055

(22) Filed: May 10, 2013

(51) Int. Cl.
 *G06F 11/00* (2006.01)
 *G06F 9/455* (2006.01)

(52) U.S. Cl.
 CPC .................................. *G06F 9/45533* (2013.01)

(58) Field of Classification Search
 USPC .................................................. 714/4.11, 4.1
 See application file for complete search history.

(56) References Cited

U.S. PATENT DOCUMENTS

| | | | |
|---|---|---|---|
| 2006/0005189 A1* | 1/2006 | Vega et al. ........................ | 718/1 |
| 2009/0288084 A1* | 11/2009 | Astete et al. ..................... | 718/1 |
| 2013/0036323 A1* | 2/2013 | Goose et al. .................. | 714/4.11 |
| 2013/0198739 A1* | 8/2013 | Razdan ............... | G06F 9/45558 718/1 |
| 2013/0254500 A1* | 9/2013 | Nakajima et al. ............. | 711/162 |

\* cited by examiner

*Primary Examiner* — Sarai Butler
(74) *Attorney, Agent, or Firm* — Gilliam IP PLLC

(57) ABSTRACT

Various embodiments illustrated and described herein include systems, methods, and computer program products to set up network adaptors in a virtual machine. In some embodiments, a replica virtual machine is started when a replica server takes over for a failed master server. In some embodiments, prior to, or contemporaneously with, a switchover from the master server to the replica server, a virtual storage device of the replica virtual machine is mounted outside the virtual machine environment (e.g., not to the virtual machine). Network adaptor configuration information is copied to the virtual storage device. An injector tool is also configured to run automatically when the replica virtual machine is started. The virtual storage device is the unmounted. When the virtual machine is started as part of the switchover process, the injector tool runs and uses the network adaptor configuration information to configure the network adaptor.

17 Claims, 8 Drawing Sheets

SETTING UP NETWORK ADAPTORS IN A VIRTUAL MACHINE

BACKGROUND

The disclosure relates generally to switching from a master server to a replica server. More particularly, the disclosure relates to configuring virtual machines or other items on the replica server as part of the switchover process.

BRIEF SUMMARY

According to one aspect of the present disclosure a replica server may mount a virtual storage drive associated with a replica copy of a virtual machine. The replica server may copy network adaptor configuration information to the virtual hard drive and configure an injector tool to automatically execute when the replica copy of the virtual machine is started. The replica server may then unmounts the virtual storage device.

When switchover to the replica server occurs, the replica copy of the virtual machine will be started. The injector tool then uses the network adaptor configuration information to automatically configure the network adaptor.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
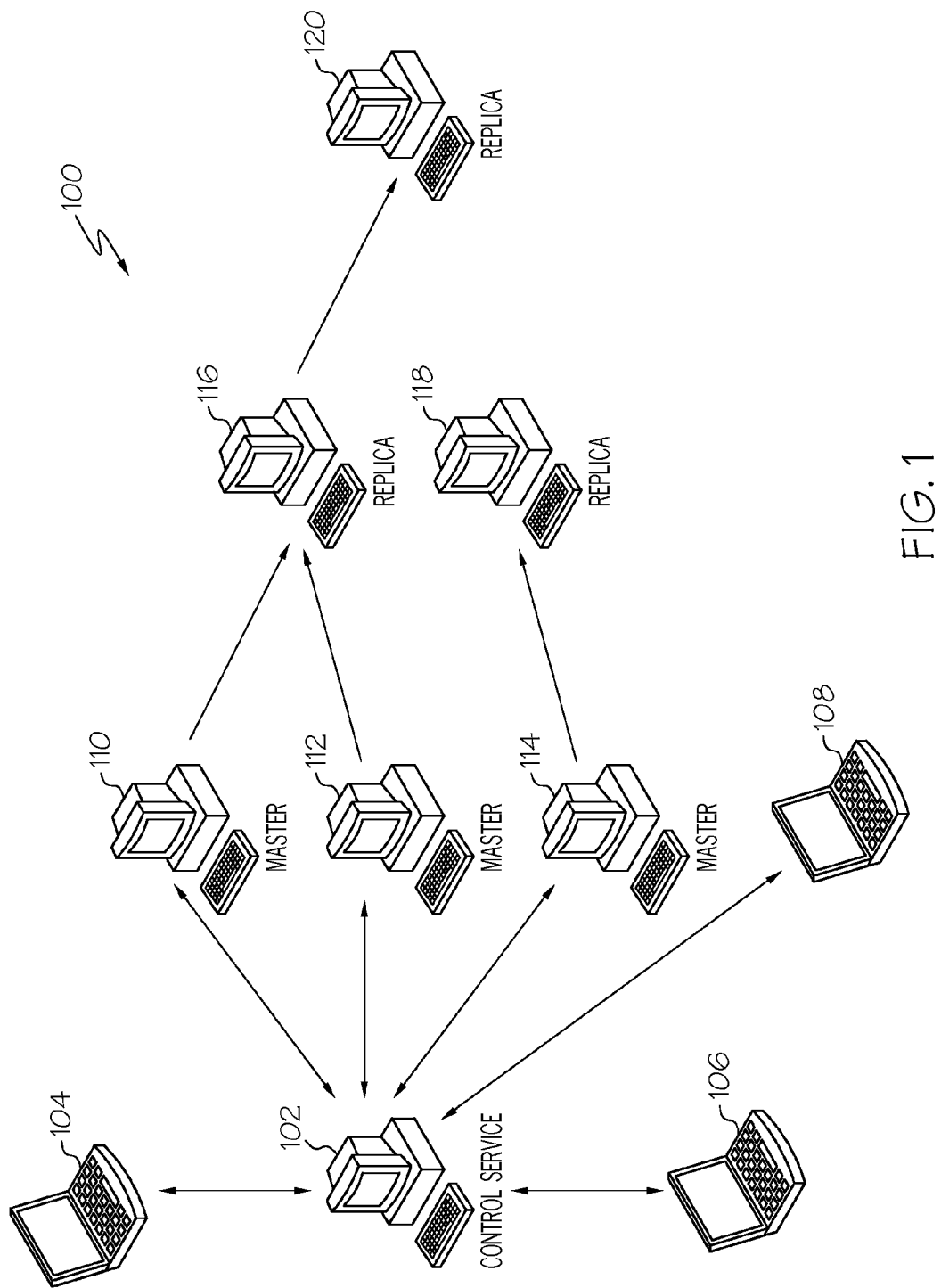
FIG. 1 illustrates an example deployment of master and replica systems.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

FIG. 1 illustrates an example deployment of master and replica systems. Such a deployment illustrates various deployment options where data on the one system is protected by copying it onto another system. The backup (e.g., replica) system becomes a copy of the primary (e.g., master) system, ready to take over should the primary system fail in any way. The deployment in FIG. 1 is illustrated generally as 100. The deployment may include a control service 102 executing on a device as depicted. Control service 102 allows administration and management of the deployment and the various entities and services within the deployment.

Control service 102 is generally accessible directly on its device, or remotely accessible through various devices and systems as illustrated by devices 104, 106, and 108. In some embodiments, access may be through a shell or other such automation. In a deployment utilizing the Windows Operating System, for example, where control service 102 is executing on a system running the Windows Operating System, control service 102 may be accessed and administered through PowerShell, which is task automation framework, consisting of a command-line shell and associated scripting language built on top of Microsoft's .NET Framework. In other embodiments, email may be used to access and interact with control service 102. In still other embodiments, devices 104, 106 and 108 may use other means to remotely access and administer control service 102.

Deployment 100 includes systems where some form of protection is desired. These are illustrated in FIG. 1 as master systems 110, 112, 114. Locations where data to be protected is copied is referred to as a replica. In addition, replica systems may protect other replica systems as discussed below. FIG. 1 illustrates replicas 116, 118 and 120. These master systems and replicas can be actual computer systems or devices or virtual systems or a combination of both.

The goal of protection is to preclude loss of the data, systems and/or services provided by a master system. Thus, if something happens to the master system, the replica can take over and the data, systems, and services previously provided by the master system may be seamlessly provided by the replica system. Some embodiments provide automatic failover to a replica system if something should happen to the master system.

To protect the data, systems and/or services provided by a master system, data, programs, services, settings, etc. may be copied from the master system to the replica system, so that the replica system becomes a copy of the master system, ready to take over should the master system fail. Although there are many different mechanisms to accomplish this, the exact details of how this type of information is copied from the master to the replica are unimportant for this disclosure. The term "replication" will be used to indicate this copy process to the extent it becomes necessary to discuss the process. Use of this term is simply by way of example and not limitation and no particular limitations should be read into the disclosure or claims by use of this term. Applicant could have also chosen "synchronization," or "copying," or any number of terms. Thus, "replication" should be construed broadly.

As illustrated in FIG. 1, multiple master systems can be replicated to a single replica system, such as where master systems 110 and 112 are replicated to replica 116. Similarly a replica can be protected by another replica, such as replica 116 is protected by replica 120.

Figure 2:
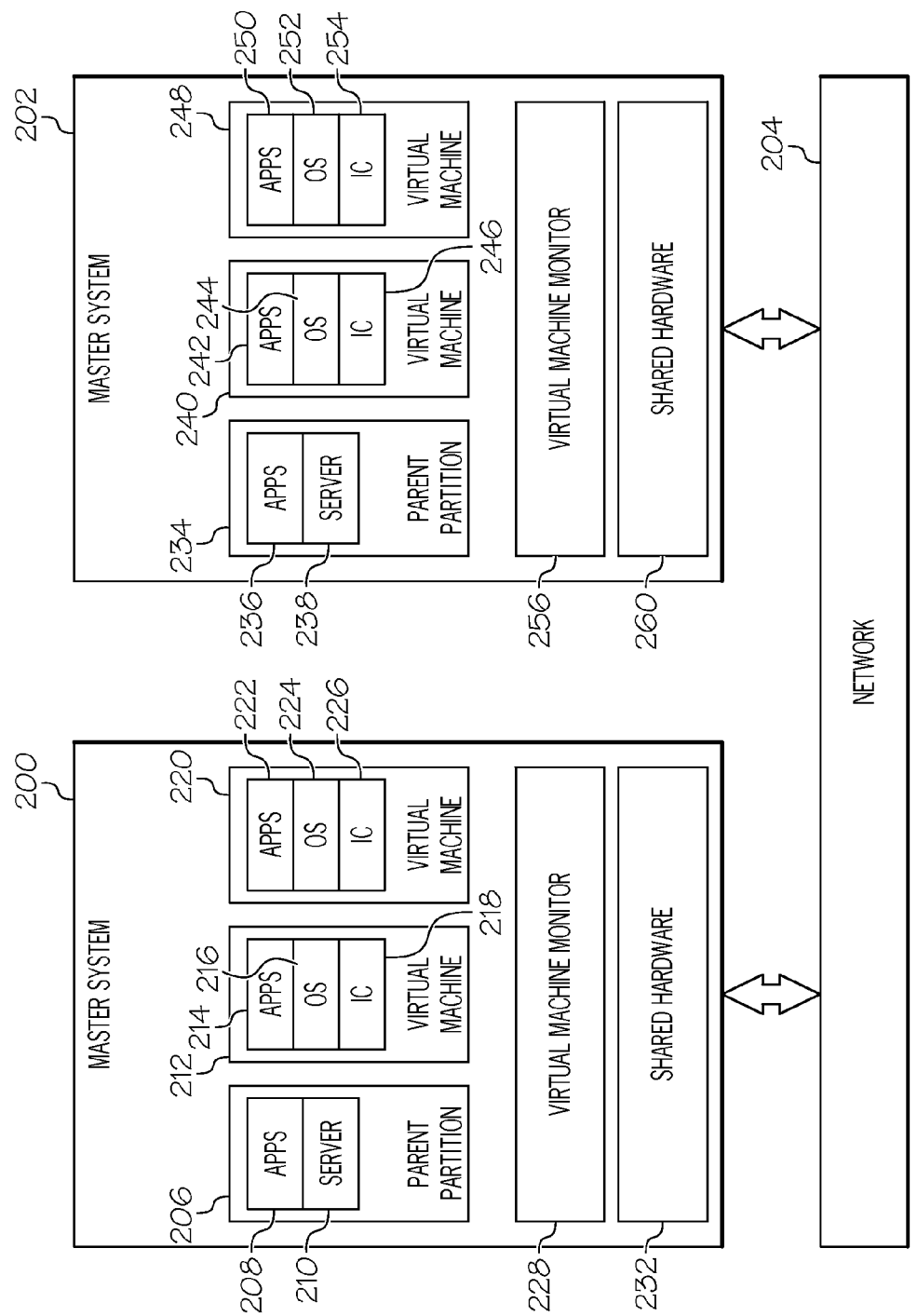
FIG. 2 illustrates an example embodiment of a master system and replica system with virtual machines.

FIG. 2 illustrates an example embodiment of a master system and replica system with virtual machines. This example embodiment comprises master system 200 and replica system 202 interconnected by network 204. Although master system 200 and replica system 202 are illustrated as physical machines, they may also be virtual systems as well. Network 204 may represent any type of connection between master system 200 and replica system 202, such that information may flow between them.

Master systems may comprise virtual machines that are replicated to a replica system. Thus, master system 200 comprises virtual machine 212 replicated as virtual machine 240 on replica system 202. Virtual machine 220 may be replicated as virtual machine 248.

A typical virtual machine may comprise applications, a virtual machine operating system, and integration or interface components that interface the virtual machine into the execution environment. These interface components may be drivers and other components that allow the virtual machine to function in the overall environment. Applications on a virtual machine may be any type of applications that would run on a non-virtual machine (e.g., physical system). The virtual machine operating system is the brand of operating system executed by the virtual machine such as some version of the Windows operating system by Microsoft Corp., some distribution of Linux, the one of the Macintosh operating systems by Apple Inc., etc. Thus, virtual machine 212 may comprise applications 214, virtual machine operating system 216 and interface component 218. Virtual machine 220 may comprise applications 222, virtual machine operating system 224 and interface component 226. Virtual machine 240 may comprise applications 242, virtual machine operating system 244 and interface component 246. Virtual machine 248 may comprise applications 250, virtual machine operating system 252 and interface component 254. For purposes of this disclosure, things that are within or execute within the virtual machine will be referred to as within the virtual machine environment. Things that are not within the virtual machine environment will be referred to as outside the virtual machine environment.

The exact architecture of how virtual machines integrate into a shared hardware environment depends on the exact virtual machine embodiments utilized. Thus the components that comprise the environment for virtual machines 212, 220, 240 and 248 may be different for different embodiments. Thus, the components illustrated and discussed with respect to FIG. 2, are simply exemplary and all such components need not exist or exist in the illustrated form.

In some embodiments, the host system will have a parent partition or other such entity to coordinate and manage the various virtual machines in the host system. For example, Microsoft's Hypervisor may contain a parent partition that is a logical hard drive division in the Microsoft's Hypervisor environment. A parent partition is responsible for running the Hypervisor layer and creating and managing child partitions (e.g., virtual machines, such as virtual machine 212, 220, 240, and 248). Thus, master system 200 may comprise parent partition 206, which may be replicated to replica system 202 as parent partition 234.

A parent partition may comprise applications, such as applications 208. These are applications that run on the parent partition and are applications that run on the master system itself. Applications 208 may be replicated to replica system 202 as applications 234.

A parent partition may also contain various components of a virtualization stack, which are used by the parent partition to manage the virtual machines. In FIG. 2, these are illustrated as server 210. Server 210 may be replicated to replica system 202 as server 238.

Master system 200 may also comprise virtual machine monitor 228, such as Microsoft's Hypervisor layer. The virtual machine monitor 228 is the virtualization layer(s) that provide the ability to create multiple isolated instances that share the same underlying hardware resources. Replica system 202 may also comprise virtual machine monitor 256. Both master system 200 and replica system 202 may comprise shared hardware, illustrated as shared hardware 232 and shared hardware 260, respectively.

Figure 3:
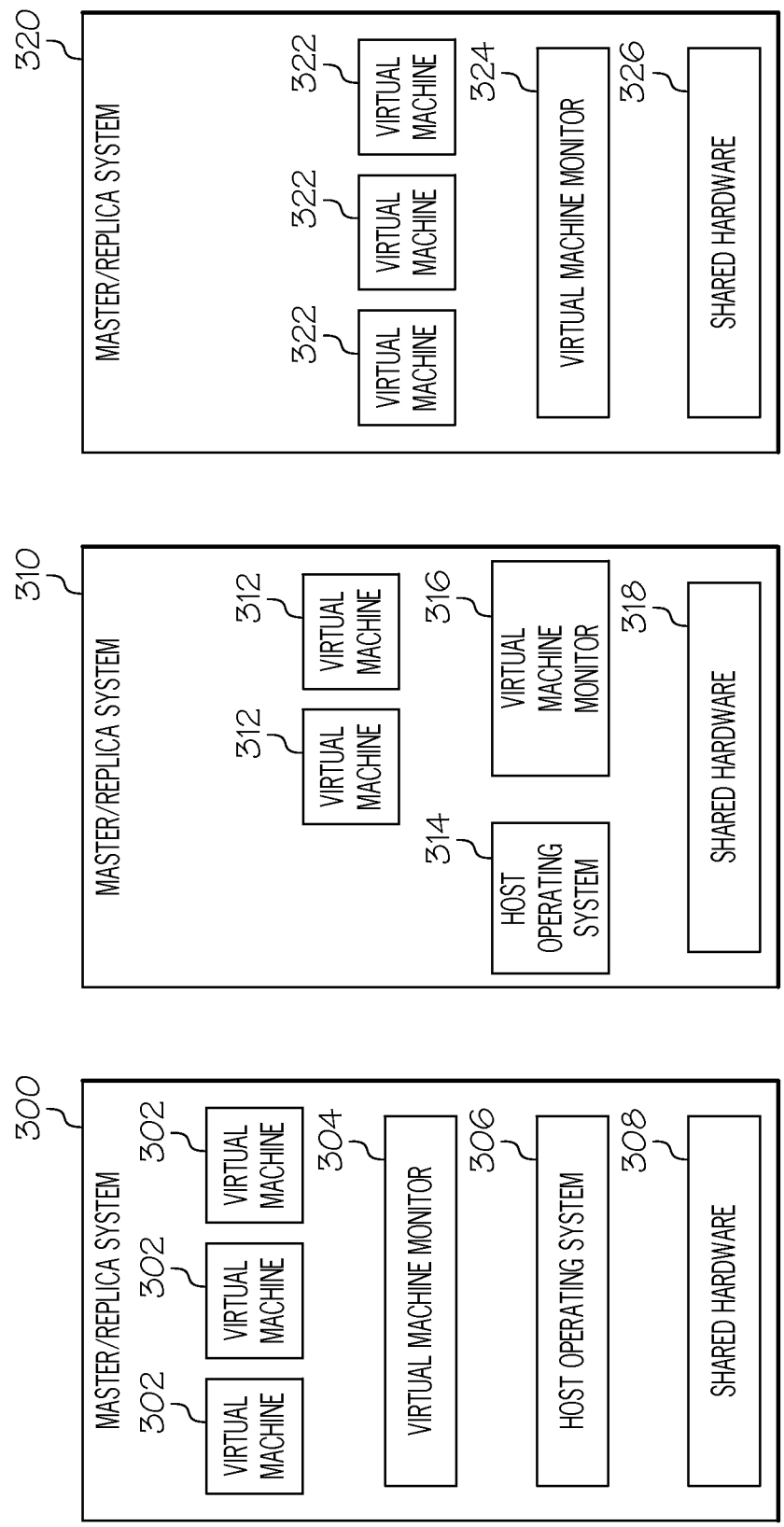
FIG. 3 illustrates example virtual machine execution environments.

Other virtual machine execution environments exist that may also be used. FIG. 3 illustrates some example virtual machine execution environments. Illustrated embodiments may be suitable for both a master system and/or a replica system.

System 300 of FIG. 3 may comprise virtual machines 302, virtual machine monitor 304, host operating system 306, and shared hardware 308. Virtual machine monitor 304 creates an isolation layer and allows the virtualized environment of virtual machines 302. Host operating system 306 provides the interface to the shared hardware.

System 310 of FIG. 3 may comprise virtual machines 312, host operating system 314, virtual machine monitor 316 and shared hardware 318. Virtual machine monitor 316 creates the virtualization layer and directly interfaces with shared hardware 318, without the need to go through the host operating system, although some services of the host operating system may be relied upon in some embodiments. Host operating system 314 provides an execution environment like that of a system without a virtual machine. However, as illustrated, virtual machines 312 and host operating system 314 are isolated from each other.

System 320 may comprise virtual machines 322, virtual machine monitor 324, and shared hardware 326. Virtual machine monitor 324 provides the virtualization layer and interfaces directly to shared hardware 326. Virtual machine monitor 324 may comprise drivers and other interface components so that virtual machines 322 need not include such drivers and/or interface components.

In some master system/replica system configurations, the master system and replica system may be on different subnets. If the master system has a virtual machine that uses a static network address, when switchover to the replica system occurs, a replicated virtual machine on the replica system would be unreachable as the replicated virtual machine would have the static network address of the virtual machine on the master system, which is now trying to access a different subnet than the subnet on which the replica machine is located. Thus, any remote access to the replicated virtual machine is precluded due to the different subnets.

Even from the replica system itself, it is not possible to access the replicated virtual machine. First, the network is configured for a different subnet so packets cannot rout to the virtual machine. In addition, to access the replicated virtual machine, appropriate credentials are required. Often, credentials are not available or accessible other than to authorized users/administrators of the virtual machine. Furthermore, it may be difficult from the replica system to identify that the situation exists from the replica system.

Consistent with this disclosure, mechanisms may implemented to automatically reconfigure a replicated virtual machine as it is brought online as part of a switchover process, even when the replicated virtual machine and the replica machine are on different subnets. Furthermore, in some embodiments, virtual machine credentials need not be provided.

Figure 4:
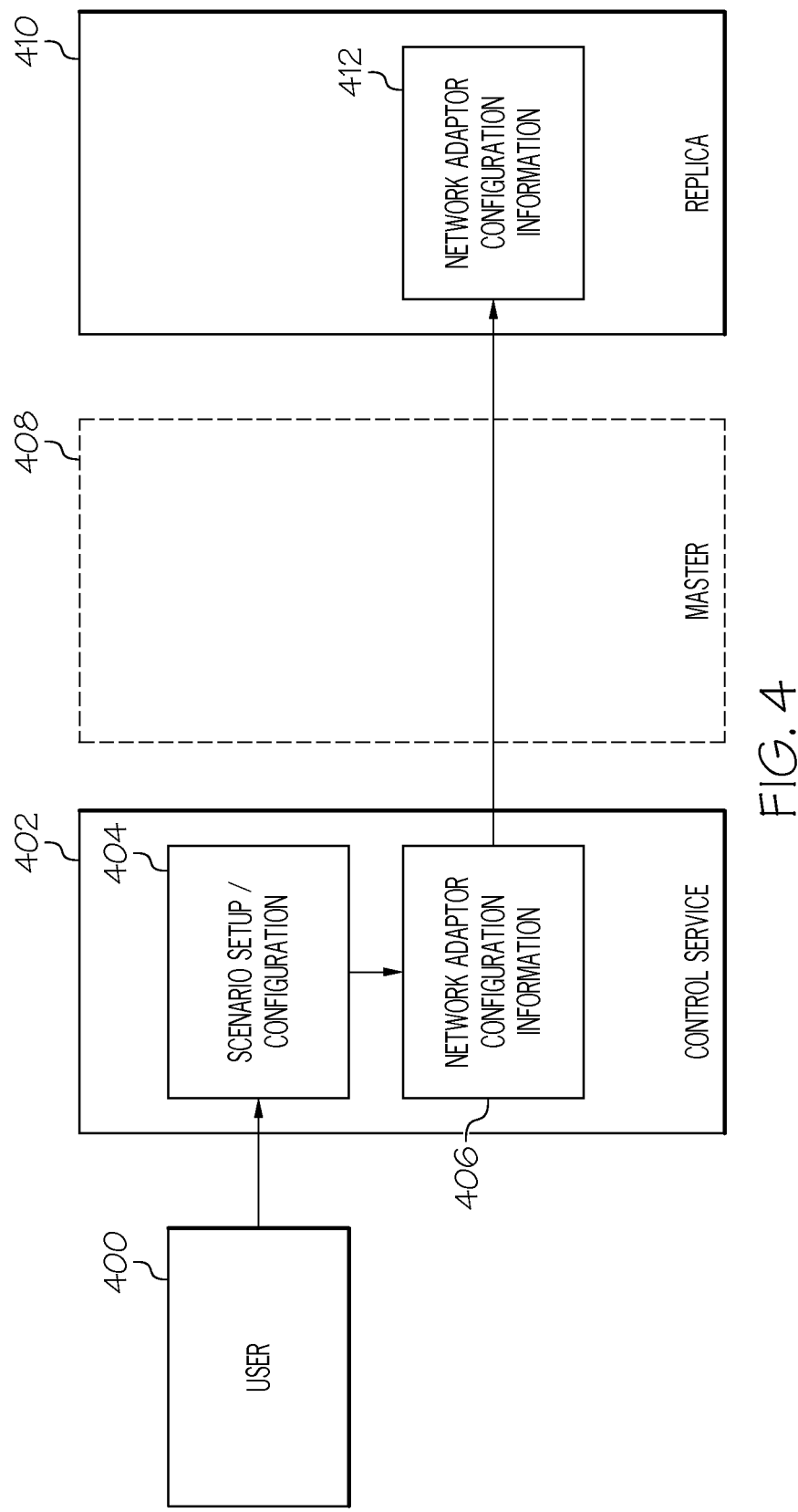
FIG. 4 illustrates an example embodiment to obtain network adaptor configuration information.

FIG. 4 illustrates an example embodiment to obtain network adaptor configuration information. This network adaptor configuration information may be used, for example, to automatically configure the network adaptor of a replicated virtual machine. User 400 may interact with control service 402 to setup and/or configure how a network adaptor of a virtual machine should be configured when switchover occurs. Scenario setup/configuration block 404 represents this scenario setup and/or configuration. User 400 may be a user (in the traditional sense) or administrator, or any other individual or system used to provide the network adaptor configuration information.

Network adaptor configuration information may comprise any necessary information to prevent the replica copy of the virtual machine from being inaccessible due to network adaptor configuration. As discussed elsewhere, this may occur when the virtual machine is one a different subnet than the replica machine. In one embodiment, the network adaptor configuration information may comprise a network address, with which the network adaptor should be configured when the virtual machine starts. In another embodiment, the network adaptor configuration information may comprise a mechanism to obtain such a network address.

The scenario setup and/or configuration may occur at different times and in different ways. In one embodiment, control service 402 may provide a setup wizard that helps a user configure replication to a replica system from a master system. This is part of the scenario setup. Various parameters and settings may be provided to control service 402 through the wizard in order to properly specify the overall setup and configuration of the replication scenario. When the system detects that a master system is on a different subnet than the replica system, and when a virtual machine has a fixed network address, the control service may gather information about what should happen when the replicated virtual machine is brought online. This can include, for example, allowing the user to manually configure the replicated virtual machine network parameters, providing suggestions as to possible configurations, allowing the virtual machine to take the replica machine subnet, etc. The control service may also ensure the configuration will not leave the replicated virtual machine stranded. Finally, in some embodiments, after switchover is initiated, the user may not be able to make configuration changes.

In another embodiment, a user may launch a tool to manually (as opposed to a wizard), configure a replication scenario. All the same options described above may be provided as part of this tool. In yet another embodiment, a user may launch a tool to reconfigure a replication scenario. As part of the reconfiguration process, all the same options described above may be provided as part of the tool. In still another embodiment, the system may proactively identify replication scenarios that would leave a virtual machine stranded and notify a user or administrator of potential problems that may be fixed.

Once the network adaptor configuration information is gathered, it may be stored as illustrated by network adaptor configuration information 406. Network adaptor configuration information 406 may then be sent to replica system 410 and stored as network adaptor configuration information 412. The transfer from control service 402 to replica system 410 may be direct, or may be indirect through a number of intermediary systems. These intermediary systems may be either master or replica systems. This indirect transfer is illustrated by master system 408 illustrated in FIG. 4 by dashed outline.

Figure 5:
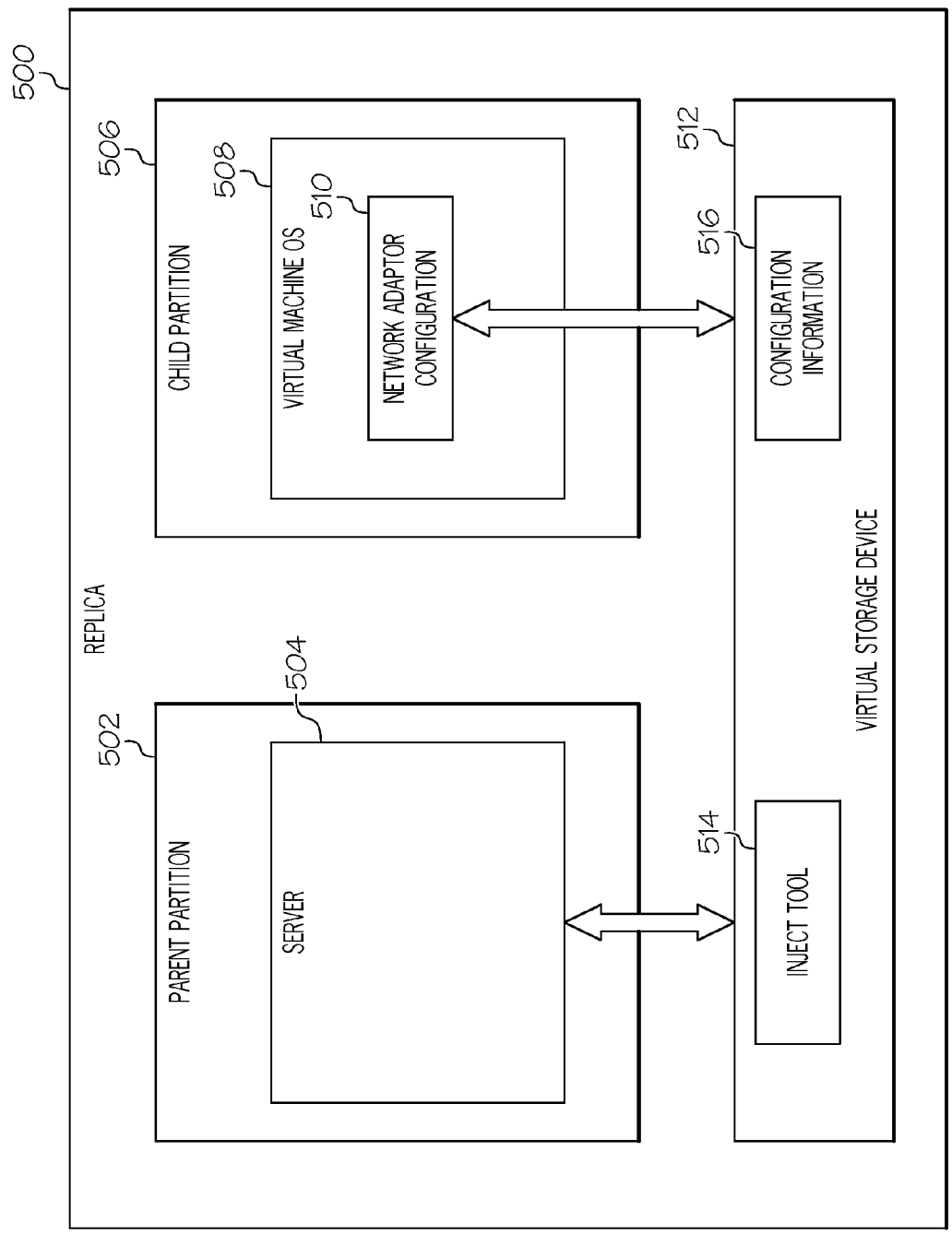
FIG. 5 illustrates an example embodiment to configure a network adaptor in a virtual machine.

FIG. 5 illustrates an example embodiment to configure a network adaptor in a virtual machine. The embodiment comprises replica system 500 that is to take over for a master system (not shown). Replica system 500 may comprise parent partition 502 and child partition 506. The parent partition/child partition nomenclature is used, for example, in Microsoft's Hypervisor product to indicate a virtual machine (child partition) and a mechanism (parent partition) to perform such functions as run the Hypervisor layer and create and manage child partitions (e.g., virtual machines). The parent partition may be thought of as an "admin" virtual machine and the child partition a virtual machine.

Child partition 506 may comprise a virtual machine operating system 508 as well as a virtual storage device 512. In a Hypervisor environment, the virtual machine (child partition) may be implemented using various files such as:
1) .XML files containing the virtual machine configuration details. In some embodiments there may be one of these for each virtual machine and each snapshot of a virtual machine. They may be named with a Globally Unique Identifier (GUID) to internally identify the virtual machine and snapshot.
2) .BIN files containing the memory of a virtual machine or snapshot that is in a saved state.
3) .VSV files containing the saved state from devices associated with the virtual machine.
4) .VHD files that are the virtual hard disks (e.g., virtual storage devices) for the virtual machine.
5) AVHD files containing differencing disk files for various virtual machine snapshots.
6) .VHDX files that are the virtual hard disks (e.g., virtual storage devices) in Windows Server 2012 virtual hard disk format.

These files may be replicated as part of the normal replication between a master system and replica system, so that the virtual machine, as replicated to the replica system, is the same as the virtual machine on the master system.

In order to automatically configure the network adaptor of child partition 506, a virtual storage device (e.g., .VHD file or .VHDX file in a Hypervisor environment) may be mounted outside the virtual machine and information stored on the machine that will be used by the child partition as the virtual machine is started as part of the switchover process. In the embodiment of FIG. 5, virtual storage device 512 is mounted to server 504. Server 504 may be any appropriate component or components outside of child partition 506 (e.g., the virtual machine) that may perform the designated functions.

When virtual storage device 512 is mounted to server 504, server 504 may copy network adaptor configuration information 516 to the virtual storage device and set inject tool 514 to execute when child partition 506 is started. Inject tool 514 may already exist on virtual storage device 512 or may be placed there by server 504 or by another component. How inject tool 514 is configured to run depends on the virtual machine operating system 508. If virtual machine operating system 508 is a Windows operating system, inject tool 514 may be configured to run at startup by making an appropriate configuration change to the registry, for example. Other mechanisms may also be used.

Network adaptor configuration information may comprise any necessary information to prevent the replica copy of the virtual machine from being inaccessible due to network adaptor configuration. As discussed elsewhere, this may occur when the virtual machine is one a different subnet than the replica machine. In one embodiment, the network adaptor configuration information may comprise a network address, with which the network adaptor should be configured when the virtual machine starts. In another embodiment, the network adaptor configuration information may comprise a mechanism to obtain such a network address.

When child partition 506 is started, inject tool 514 will execute. Inject tool 514 will use network adaptor configuration information 516 to configure the network adaptor of the virtual machine as illustrated by network adaptor configuration 510.

Figure 6:
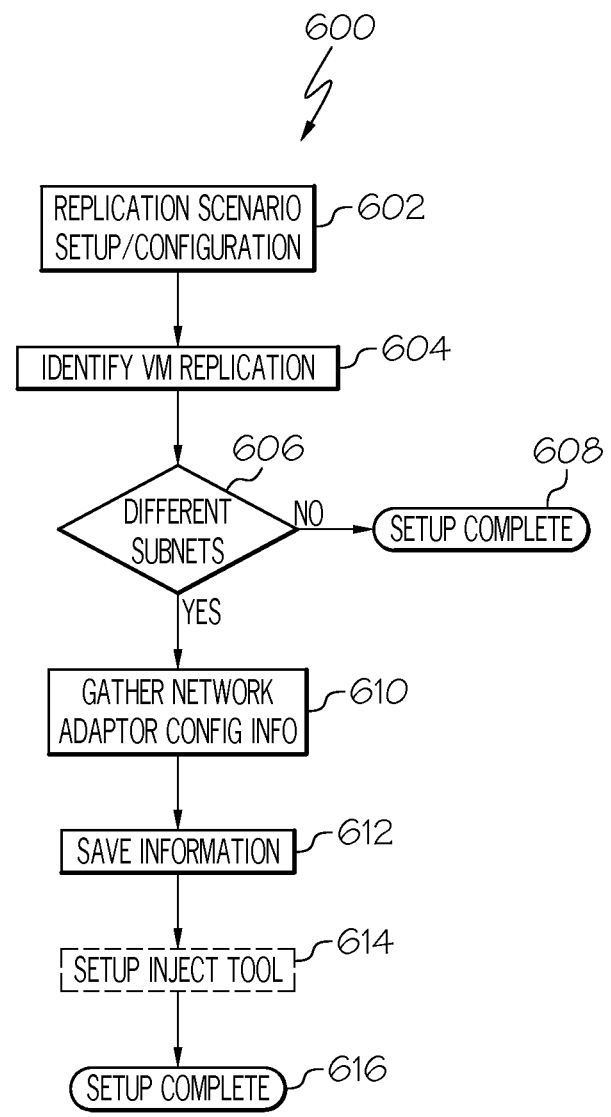
FIG. 6 illustrates an example process to set up a virtual machine adaptor configuration.

FIG. 6 illustrates an example process to set up a virtual machine adaptor configuration. The process, shown generally as 600, may be part of a replication scenario setup, configuration, and/or reconfiguration process. Block 602 represents any other type of setup, configuration, and/or reconfiguration processes that are performed. For ease of discussion, the description of FIG. 6 will use setup to mean setup, configuration, and/or reconfiguration.

As part of replication setup, the system may identify that a virtual machine exists on one system and will be replicated to another. This is illustrated by block 604. The identification may be automatic, such as when the system identifies the files and other information that will be replicated, or may be manual, such as when the user, system, and/or entity performing the setup identifies replication of a virtual machine.

If a virtual machine is to be replicated, the next question is whether the virtual machine to be replicated and the replica system where the virtual machine will be replicated to, have different subnets. This occurs, for example, when the virtual machine is configured with a static network address identifying one subnet and the replica system is located on a different subnet. If both the virtual machine and the replica system are on the same subnet, setup may be complete as identified by block 608 assuming no other setup tasks need be performed. If the virtual machine uses dynamically assigned network addresses such that reassignment of the network address of the replica copy of the virtual machine at startup will place both the virtual machine and the replica system on the same subnet, then execution may also proceed to block 608 as the replica copy of the virtual machine will not be stranded upon startup.

If, however, the replica copy of the virtual machine upon startup will be assigned to a different subnet than the replica machine, additional configuration for the network adaptor will be needed when the replica copy of the virtual machine is started. Execution then proceeds to block 610.

In block 610, network adaptor configuration information will be gathered. This may occur, for example, as described in conjunction with FIG. 4. The system may gather needed network adaptor configuration information from a user, process, system or other entity that can provide the desired information. In general, the network adaptor configuration will identify a network address that should be assigned when the virtual machine is started. Such an address may be assigned manually, and/or with suggestion/help from the system. Such an address may also be assigned dynamically.

Once the required adaptor configuration information is received, it may be stored for later use as indicated by block 612. Finally, any setup needed for the injector tool may be performed. This is illustrated by block 614, shown in dashed outline due to the optional nature of the block. Setup for the injector tool may comprise obtaining the injector tool so that it may be passed, along with the network adaptor configuration information, to the replica machine. Setup for the injector tool may also comprise any configuration or tailoring that should be done so that it will function properly within the desired context. Once any injector tool setup is performed, setup is complete as indicated by block 616.

Figure 7:
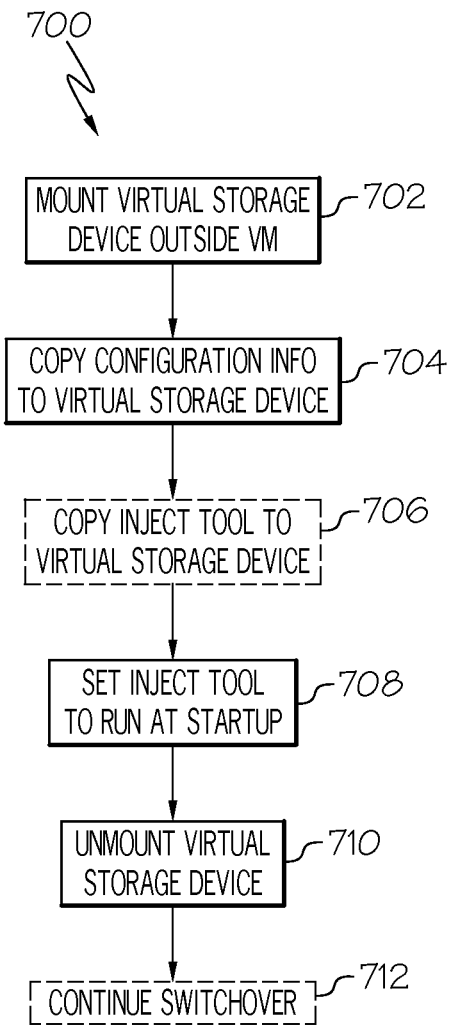
FIG. 7 illustrates an example process to configure virtual machine adaptor.

FIG. 7 illustrates an example process to configure virtual machine adaptor. The process, shown generally as 700, may be part of the switchover process (e.g., bringing a replica system online) or may be performed outside of the switchover, depending on the embodiment.

In block 702, a virtual storage device associated with the replica copy of the virtual machine is mounted outside the virtual machine. It is mounted to a component or system that will set items up in order to configure the network adaptor of the replica copy of the virtual machine when the replica copy of the virtual machine starts up. This may be, for example, server 504 of FIG. 5. Other components or systems may be used in other embodiments.

In block 704 the network adaptor configuration information is copied to the virtual storage device. Network adaptor configuration information may comprise any necessary information to prevent the replica copy of the virtual machine from being inaccessible due to network adaptor configuration. As discussed elsewhere, this may occur when the virtual machine is one a different subnet than the replica machine. In one embodiment, the network adaptor configuration information may comprise a network address, with which the network adaptor should be configured when the virtual machine starts. In another embodiment, the network adaptor configuration information may comprise a mechanism to obtain such a network address.

In block 706, the inject tool is copied to the virtual storage device, if it does not already reside thereon.

In block 708, the inject tool is set to run when the virtual machine is started. How this is accomplished depends on the embodiment. If the virtual machine operating system is a Windows operating system, the inject tool may be configured to run at startup by making an appropriate configuration change to the registry, for example. Other mechanisms may also be used for both the Windows operating system and other operating systems.

In block 710, the virtual storage device is unmounted. The virtual storage device is then ready to be mounted to the virtual machine upon virtual machine startup.

In block 712, the switchover process is continued, if the configuration is part of the switchover process.

Upon switchover, the virtual machine will be started, and as part of the startup process, the inject tool will be started and the network adaptor configuration information will be used by the inject tool to configure the network adaptor of the virtual machine. In this manner, appropriate information in the network adaptor configuration will preclude the virtual machine from becoming stranded at startup. Also, no virtual machine credentials are needed to perform the configuration.

Figure 8:
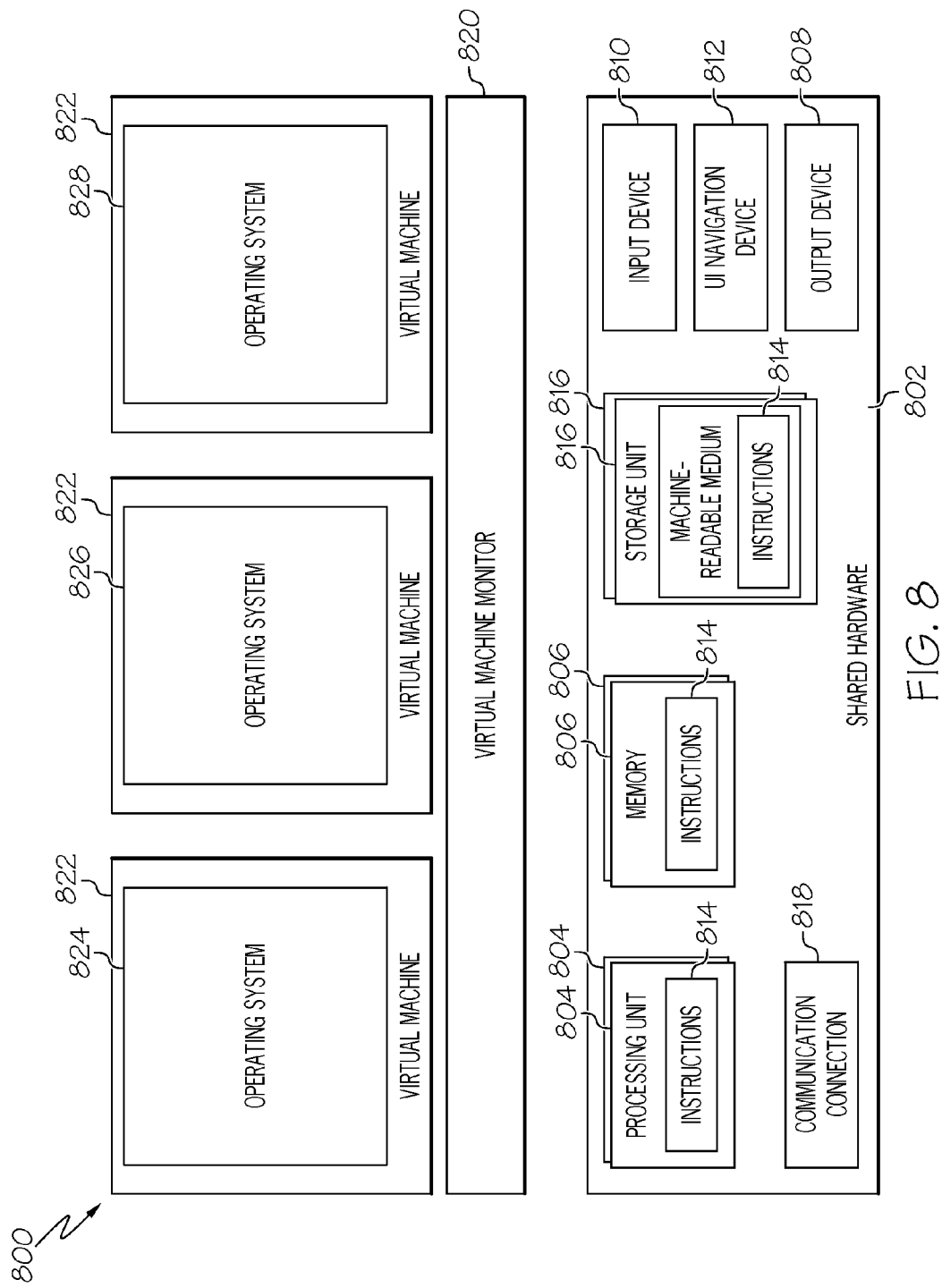
FIG. 8 illustrates an example embodiment of a device suitable for use herein.

An example embodiment extends to a machine in the example form of a computing device, such as that of FIG. 8, within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. In one embodiment, multiple such machines are utilized in a distributed network to implement multiple components in a transaction based environment. An object-oriented, service-oriented, or other architecture may be used to implement such functions and communicate between the multiple systems and components.

The machine may be a personal computer (PC), a tablet device, a Personal Digital Assistant (PDA), a cellular telephone or smartphone, a web appliance, etc. Further, while only a single machine is illustrated, the term "machine" shall also be taken to include any collection of machines that individually or jointly execute a set (or multiple sets) of instructions to perform any one or more of the methodologies discussed herein.

An example machine 800 is illustrated in FIG. 8 and may include a shared hardware 802. Shared hardware may include processing unit 804 (e.g., a central processing unit (CPU), a graphics processing unit (GPU), advanced processing unit (APU) or any of the above in any combination), and memory 806 of various forms. The machine may further include a display or other output device 808 and an input device 810 such as keyboard, touch screen, various user interfaces such as on screen keyboards, gesture input, voice input, etc. In some embodiments, a separate UI navigation device 812 may also be included.

Machine-Readable Medium

Embodiments also may include machine-readable storage medium on which is stored one or more sets of instructions and data structures (e.g., collectively instructions 814) embodying or used by any one or more of the methodologies or functions described herein. The instructions may also reside, completely or at least partially, within the memory or within the processor during execution thereof by the computer system, with the memory and the processor also constituting machine-readable media.

While the machine-readable storage medium may be shown in an example embodiment to be a single medium, the term "machine-readable storage medium" may include a single storage medium or multiple storage media (e.g., a centralized or distributed database, or associated caches and servers) that store the one or more instructions. The term "machine-readable storage medium" shall also be taken to include any tangible medium that is capable of storing, encoding, or carrying instructions for execution by the machine and that cause the machine to perform any one or more of the methodologies of embodiments of the present application, or that is capable of storing, encoding, or carrying data structures used by or associated with such instructions. The term "machine-readable storage medium" shall accordingly be taken to include, but not be limited to, solid-state memories and optical and magnetic media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks. Any of which can be either removable storage or non-removable storage, although some are typically found as one or the other (e.g. removable or non-removable). In FIG. 8, memory 806, storage unit 816, are examples of such machine-readable storage media and may be any of the devices listed above. Machine-readable storage media may also include volatile memory.

Transmission Medium

The instructions may further be transmitted or received over a communications network using a transmission medium via a network interface device (using, for example communication connection 818) and utilizing any one of a number of well-known transfer protocols. Examples of communication networks include a local area network (LAN), a wide area network (WAN), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

FIG. 8 illustrates a representative architecture virtual machine monitor 820, virtual machines 822, each with an operating system 824, 826, 828. This architecture is simply representative and not all embodiments need all illustrated architectural blocks. The illustrated architectural blocks may be implemented as instructions 814.

The virtual machine monitor 820 is the virtualization layer(s) that provide the ability to create multiple isolated instances that share the same underlying hardware resources. An example includes Hypervisor (HyperV) by Microsoft, Corp. Virtual machines 824 are hosted within the execution environment. Each virtual machine has its operating system (824, 826, and 828), which may or may not be the same from virtual machine to virtual machine.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The embodiments illustrated herein are described in sufficient detail to enable those skilled in the art to practice the teachings disclosed. Other embodiments may be used and derived there from, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method comprising:

determining that a first server, which hosts a virtual machine, is in a first subnet and that a second server, which hosts a replica copy of the virtual machine, is in a second subnet;

determining that the virtual machine has a fixed network address;

in response to determining that the first server and the second server are in different subnets and that the virtual machine has a fixed network address, determining, at a control service, network adaptor configuration information for a network adaptor of the replica copy based, at least in part, on the first and second servers being in different subnets;

mounting, at the second server but outside of a child partition corresponding to the replica copy of the virtual machine, a virtual storage drive associated with the replica copy of the virtual machine;

copying the network adaptor configuration information to the virtual storage drive;

setting an injector tool to configure a virtual network adaptor of the replica copy with the network adaptor configuration information in response to start up of the replica copy of the virtual machine for switchover from the virtual machine to the replica copy of the virtual machine; and unmounting the virtual storage drive after configuration of the virtual network adaptor.

2. The method of claim 1 further comprising:

detecting, by the second server, failure of the first server; and initiating switch over to the second server, the switch over comprising starting the replica copy of the virtual machine.

3. The method of claim 1 wherein setting the injector tool comprises modifying a registry of an operating system of the replica copy of the virtual machine to cause the injector tool to auto run when the virtual machine is started.

4. The method of claim 1 wherein the network adaptor configuration information is gathered from a user.

5. The method of claim 1 wherein the virtual storage drive is mounted by a virtualization stack component in a parent partition of the second server, the parent partition not being part of the child partition corresponding to the replica copy of the virtual machine.

6. A system comprising:
a processor coupled to a memory device;
instructions stored on the memory device, the instructions executable by the processor to cause the system to:
determine that a first server, which hosts a virtual machine, is in a first subnet and that a second server, which hosts a replica copy of the virtual machine, is in a second subnet;
determine that the virtual machine has a fixed network address;
in response to a determination that the first server and the second server are in different subnets and that the virtual machine has a fixed network address, determine network adaptor configuration information for a virtual network adaptor of the replica copy based, at least in part, on the first and second servers being in different subnets;
mount a virtual machine storage drive associated with the virtual machine, wherein the instructions to mount are executable by the processor to cause the system to mount the virtual machine storage drive at the second server that hosts the replica copy but outside of a child partition corresponding to the replica copy of the virtual machine;
copy the network adaptor configuration information to the virtual machine storage drive;
set an injector tool to use the network adaptor configuration information to configure the virtual network adaptor of the replica copy of the virtual machine in response to the replica copy starting for switchover from the virtual machine; and
unmount the virtual machine storage drive after configuration of the virtual network adaptor.

7. The system of claim 6 wherein the memory device also has instructions executable by the processor to cause the system to monitor the first server and, upon failure of the first server, to initiate switchover to start the replica copy of the virtual machine.

8. The system of claim 6 wherein the instructions to mount comprise instructions executable by the processor to cause the system to mount the virtual machine storage drive to a hypervisor's host server.

9. The system of claim 6 wherein the instructions to set the injector tool comprise instructions executable by the processor to cause the system to modify a registry of an operating system of the replica copy of the virtual machine.

10. The system of claim 6 wherein the network adaptor configuration information comprises a static network address for the replica copy of the virtual machine.

11. A computer program product for switchover from a virtual machine to a replica copy of the virtual machine in a different subnet, the computer program product comprising:
a non-transitory machine-readable medium having program code embodied therewith, the program code to:
determine that a first server, which hosts the virtual machine, is in a first subnet and that a second server, which hosts the replica copy of the virtual machine, is in a second subnet;
determine that the virtual machine has a fixed network address;
in response to a determination that the first server and the second server are in different subnets and that the virtual machine has a fixed network address, determine network adaptor configuration information for a virtual network adaptor of the replica copy based, at least in part, on the first and second servers being in different subnets;
mount a virtual machine storage drive associated with the virtual machine, wherein the program code to mount comprises program code to mount the virtual machine storage drive at the second server but outside of a child partition corresponding to the replica copy of the virtual machine;
copy the network adaptor configuration information to the virtual machine storage drive;
set an injector tool to use the network adaptor configuration information to configure the virtual network adaptor of the replica copy of the virtual machine in response to the replica copy starting for switchover from the virtual machine; and
unmount the virtual machine storage drive after configuration of the virtual network adaptor.

12. The computer program product of claim 11 wherein the network adaptor configuration information comprises a network address to be used by the replica copy of the virtual machine once started.

13. The computer program product of claim 12 wherein the network address is a static network address.

14. The computer program product of claim 12 wherein virtual machine storage drive is mounted to a hypervisor's host server.

15. The computer program product of claim 14 wherein the program code to set the injector tool comprises program code to edit a registry of an operating system of the replica copy of the virtual machine.

16. The computer program product of claim 11 wherein the network adaptor configuration information is collected from a user.

17. The computer program product of claim 11 further comprising program code configured to monitor the first server and, upon failure of the first server, to initiate switchover that causes the second server to start the replica copy of the virtual machine.

* * * * *